Figure 1:
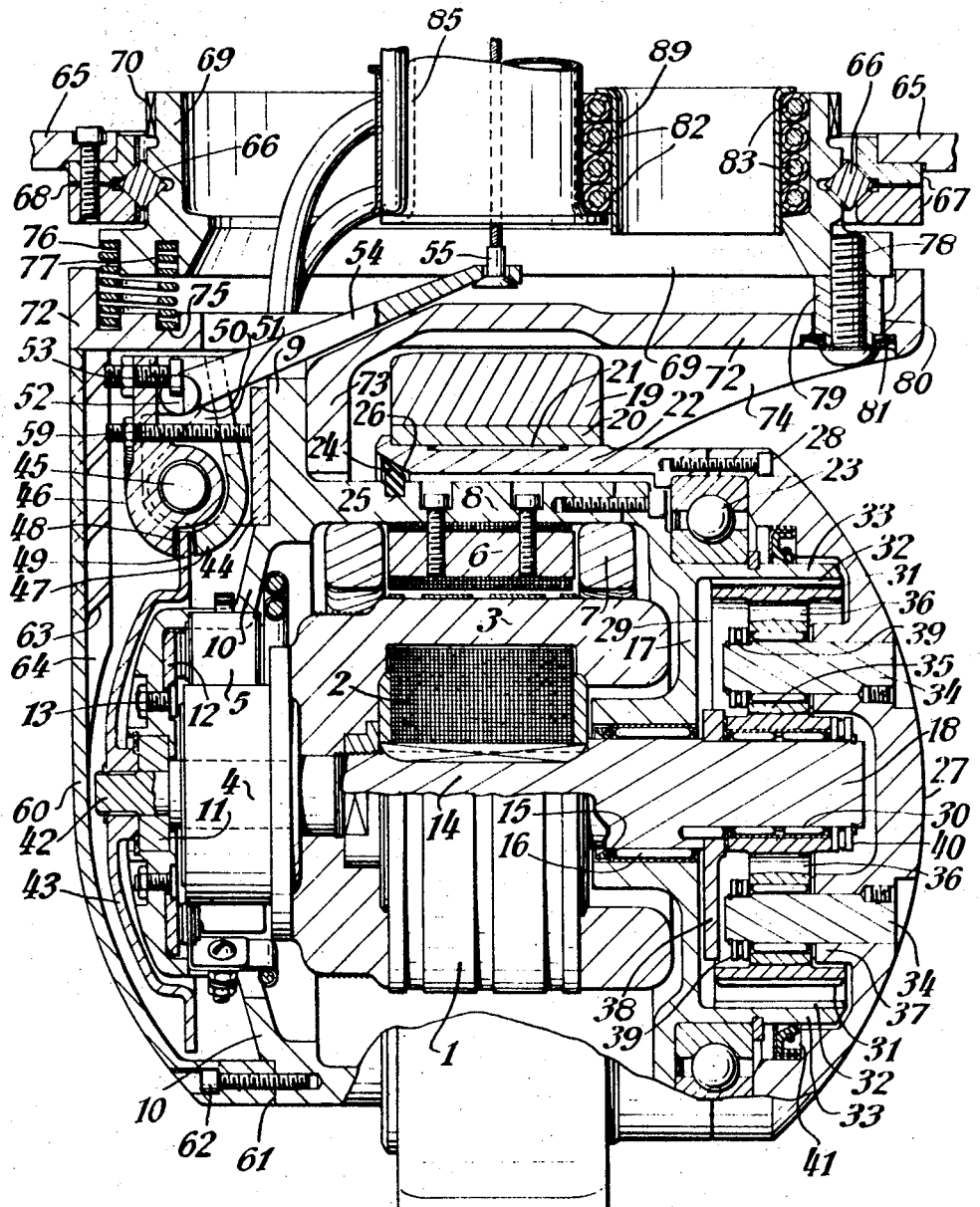

United States Patent

[11] 3,608,661

| [72] | Inventor | Alfred R. E. Arnot<br>The Bell House, Baughurst, Basingstoke,<br>Hampshire, England |
|---|---|---|
| [21] | Appl. No. | 747,048 |
| [22] | Filed | July 8, 1968 |
| [45] | Patented | Sept. 28, 1971 |
| [32] | Priority | Apr. 17, 1964 |
| [33] | | Great Britain |
| [31] | | 16,114/64 |
| | | Continuation-in-part of application Ser. No. 448,011, Apr., 1965, now abandoned. |

[54] MOTORIZED WHEEL TRACTION DRIVE UNITS
11 Claims, 6 Drawing Figs.

[52] U.S. Cl. .................................................. 180/65 F,
74/804, 180/10, 180/52, 180/48 R, 180/60,
180/66, 188/18, 280/124 R, 301/9
[51] Int. Cl. ........................................................ B60k 7/00
[50] Field of Search .......................................... 180/52, 26,
60, 65, 65 F, 43 B, 10, 13, 43; 74/804, 805;
188/17, 18 A; 301/87, 9 TV, 13, 5.3, 5.7, 13 SM;
305/35

[56] References Cited
UNITED STATES PATENTS

| 1,995,987 | 3/1935 | Keese............................ | 180/43 |
| 2,170,951 | 8/1939 | Perry............................. | 74/804 |
| 2,726,726 | 12/1955 | LeTourneau................. | 180/43 B X |
| 3,013,447 | 12/1961 | Hils et al....................... | 74/805 |
| 3,023,825 | 3/1962 | Rabjohn........................ | 180/26 UX |
| 3,035,652 | 5/1962 | McLean....................... | 180/60 X |
| 3,161,249 | 12/1964 | Bouladon et al............. | 180/60 X |
| 3,163,250 | 12/1964 | Gibson.......................... | 180/65 F X |
| 3,217,826 | 11/1965 | Carter et al................... | 180/43 B UX |
| 3,237,991 | 3/1966 | Hurst............................. | 301/13 SM X |
| 3,370,668 | 2/1968 | Goodacre..................... | 180/52 |

FOREIGN PATENTS

| 915,658 | 1/1963 | Great Britain................ | 180/43 B |

*Primary Examiner*—A. Harry Levy
*Attorney*—Woodcock, Washburn, Kurtz & MacKiewicz ABSTRACT: A compact motorized wheel has a motor cantilevered on a support and carrying a hub and tire. A gyratory epicyclic gear couples the motor shaft to the hub.

Inventor
ALFRED R.E. ARNOT

By
BENJAMIN DE GORTER
AGENT

MOTORIZED WHEEL TRACTION DRIVE UNITS

This application is a continuation-in-part application of parent application Ser. No. 448,011, now abandoned.

The present invention relates to motorized wheel traction drive units for vehicles and particularly for forklift trucks and the like.

In the design of industrial vehicles, and particularly materials-handling vehicles such as forklift trucks, the size restrictions imposed by a demand for extreme maneuverability militates against the space requirements for apparatus to perform an ever increasing variety of handling functions. In order to accommodate all the equipment required in the space available it has become necessary to vary the shape of components according to the space limitations of each new truck design, so that equipment serving an identical purpose on different models of the same manufacture frequently necessitates an entirely different set of parts.

Nowhere is this problem more acute than in the provision of traction driving units which, although having a common function and in many cases identical power outputs, must cover arrangements comprising fixed or steerable mounting; single-, multiple-, front- or rear-wheel drive; driver or pedestrian control; electric or I.C. engine power; small or large drive wheel; differential action; braking; springing; exceptional steering lock and the like. The multiplicity of power unit designs evolved to meet these requirements entails a heavy production cost and an excessive inventory of spares for servicing so great a variety of models.

It is therefore a primary object of this invention to provide a traction drive unit which can be universally accommodated in a truck design without encroaching on any otherwise usable space, and to make provision for a large variety of possible specifications and characteristics with a small standard inventory of components.

In vehicles of the type to which the invention is applicable, the most complex form of drive unit comprises a steerable drive wheel having a large lock. In such applications it will be understood that open space must necessarily be provided in the vehicle design for the steering rotation of the wheel and its mountings, whether powered or not, substantially equivalent to a vertical cylinder of the same diameter as the wheel and high enough to accommodate a steering bearing. The present invention provides the whole of the driving unit within this otherwise unusable space by accommodating a driving motor and gear reduction within the hub of the drive wheel.

Many designs of motorized wheel are known, though most have been concerned with the elimination of mechanical transmission means in the distribution of power to drive wheel locations, and space restrictions within the size of wheel commonly so driven have presented few problems. More recently motorized wheels have been introduced in materials-handling vehicles in an attempt to displace the bulky traction components from their conventional place in the chassis, but such designs have used an obvious combination of separate assemblies resulting in a poor ratio of motor power to wheel size. Thus in order to achieve the power requirement normally associated with a 12-inch diameter drive wheel, such designs have necessitated the use of a 15-inch diameter wheel to match the length and diameter of the driving hub assembly.

It must be emphasized that the volume occupied by a 15-inch diameter steerable wheel is almost exactly twice that required by a 12-inch diameter wheel, while in a vehicle such as a reach fork truck with dual steerable motorized wheels it entails a 3-inch loss of track width and consequent lateral stability; 6-inch loss of width between the wheels which could otherwise have been used for the accommodation of other equipment; 3-inch higher mounting of the floorplate and driver's platform; and inevitably higher cost of the larger unit. Moreover the poor power/size ratio renders such a unit unattractive for incorporation in vehicles which can accept conventional transmission systems, so that motorized wheels as at present known remain special-purpose constructions unsuitable for universal application. In a motorized wheel according to the present invention, the overall axial length of the drive unit may be limited to be no greater than the diameter of the drive wheel, while the size of driving motor is equivalent to that employed, as being compatible with the maximum capacity of the tire, in conventional transmission systems.

It will be understood that in the construction of a DC traction motor of reasonably defined diameter and length, there are dimensions such as bearing width, commutator width and armature end-winding overhang which must remain sensibly constant despite minor changes in motor length, so that any change in overall motor length must be accommodated wholly by the active armature core length. Thus, if in a typical application for a small wheel the active armature length of the motor should be 2½ inches, and if the overall motor length lacks only one-half inch because of gearbox space requirements within the strictly limited overall length of the drive unit, the armature core length must be reduced to 2 inches with a power loss of 20 percent.

It is an object therefore of the present invention to provide means to integrate the functions and locations of the drive unit components so that the power/size ratio is substantially greater than can be achieved by any obvious combination of known driving mechanisms.

According to the invention, a motorized wheel traction drive unit for a vehicle comprises means for mounting said unit on said vehicle, a motor supported by said mounting means, and having an output shaft having an eccentric end, control means connected to said motor, a drive wheel mounted for rotation coaxially with said motor, and epicyclic reduction gearing comprising a gyratory planet gear driven by said eccentric end of said motor output shaft, a drive annulus gear in mesh with said planet gear, reaction takeup means mounted to transmit torque between said means for mounting said unit and said drive wheel, and balance means coupled to said motor shaft to counterbalance the eccentric weight of said planet gear.

Figure 2:
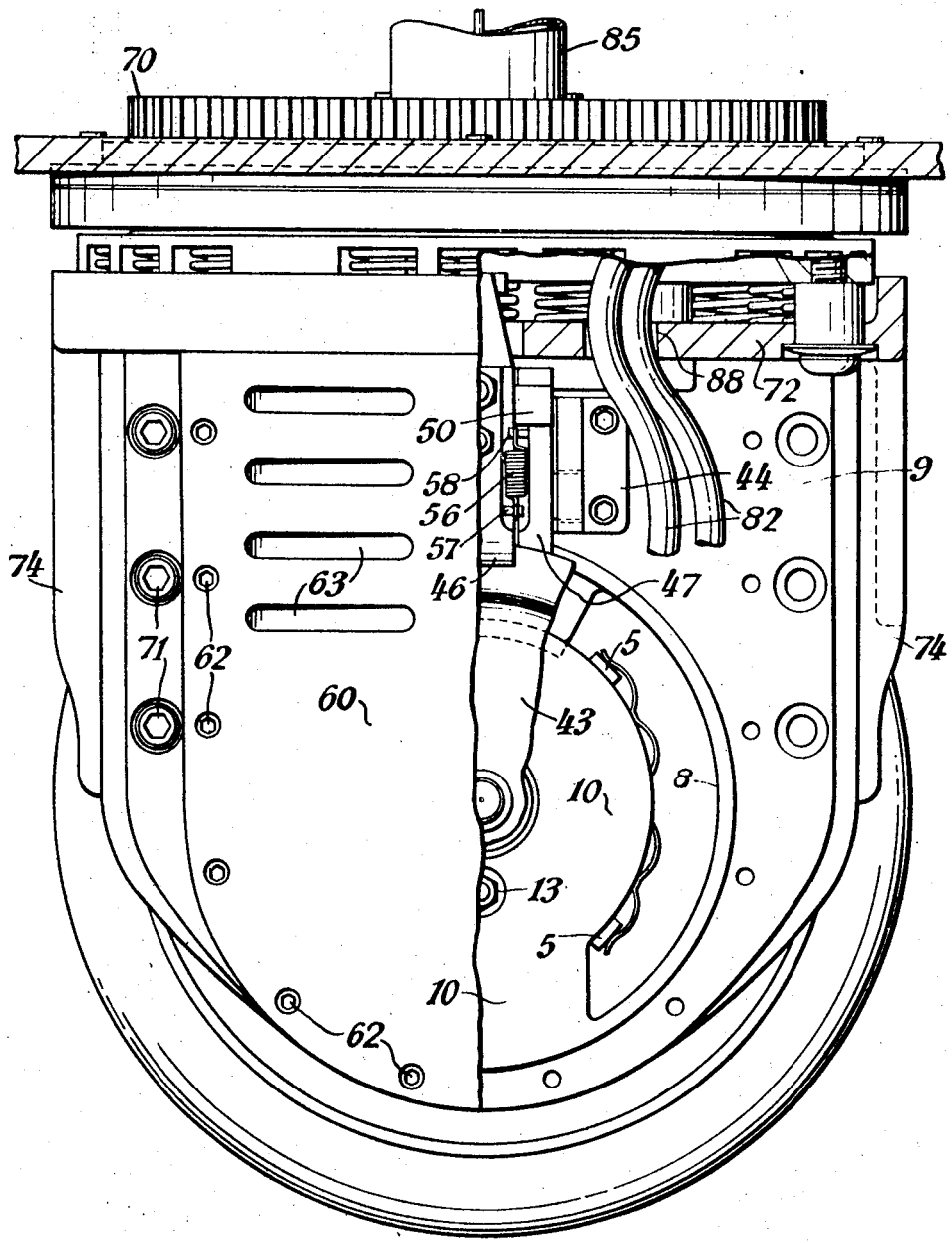
Figure 3:
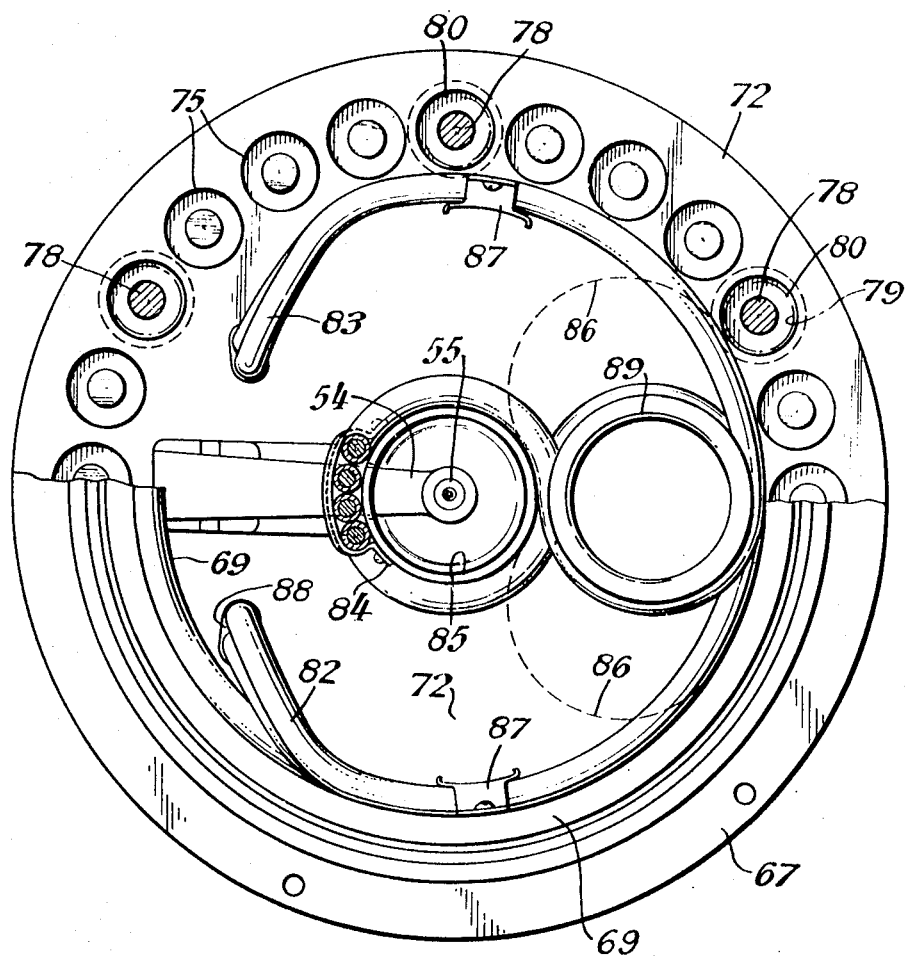
Figure 4:
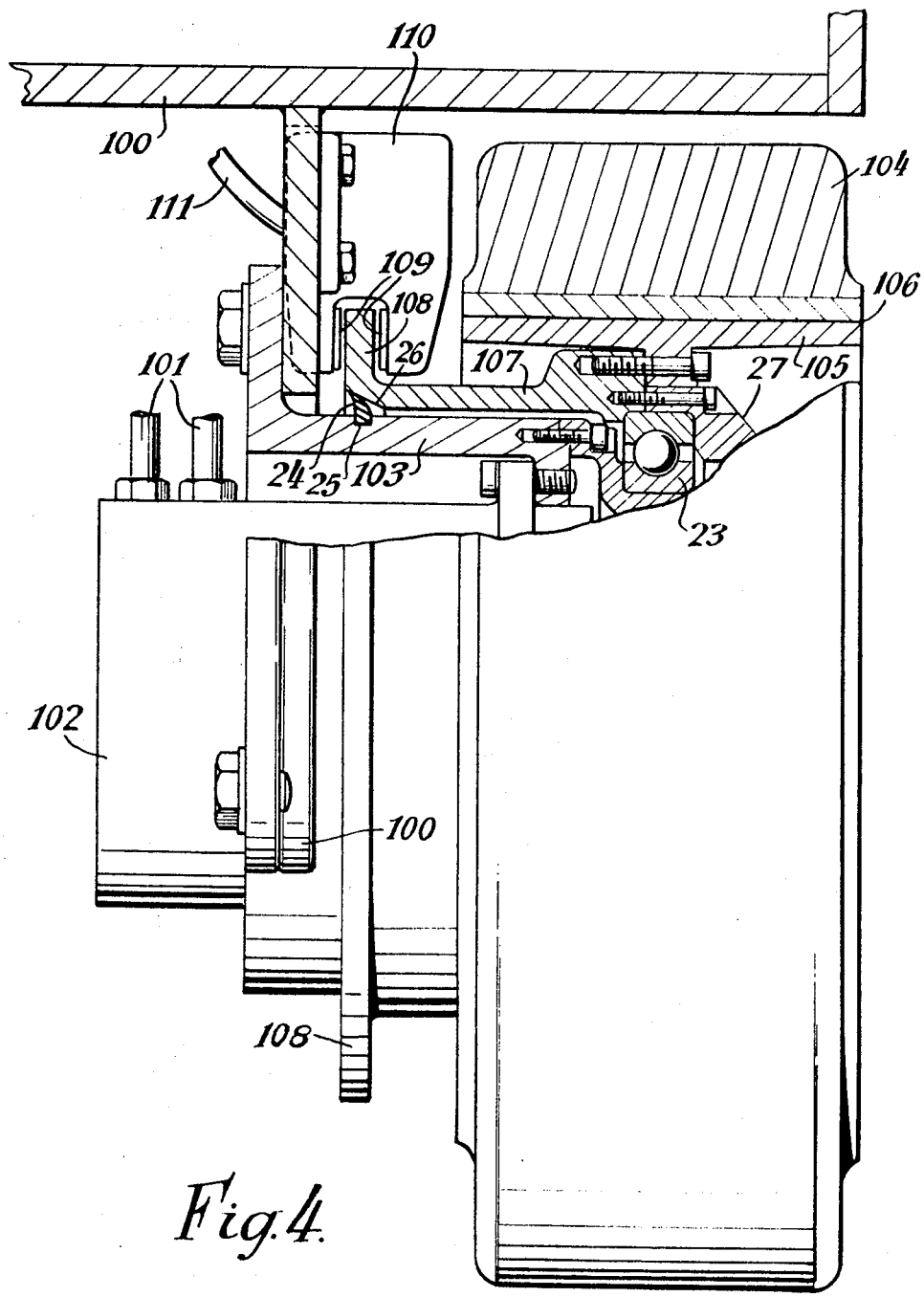
Figure 5:
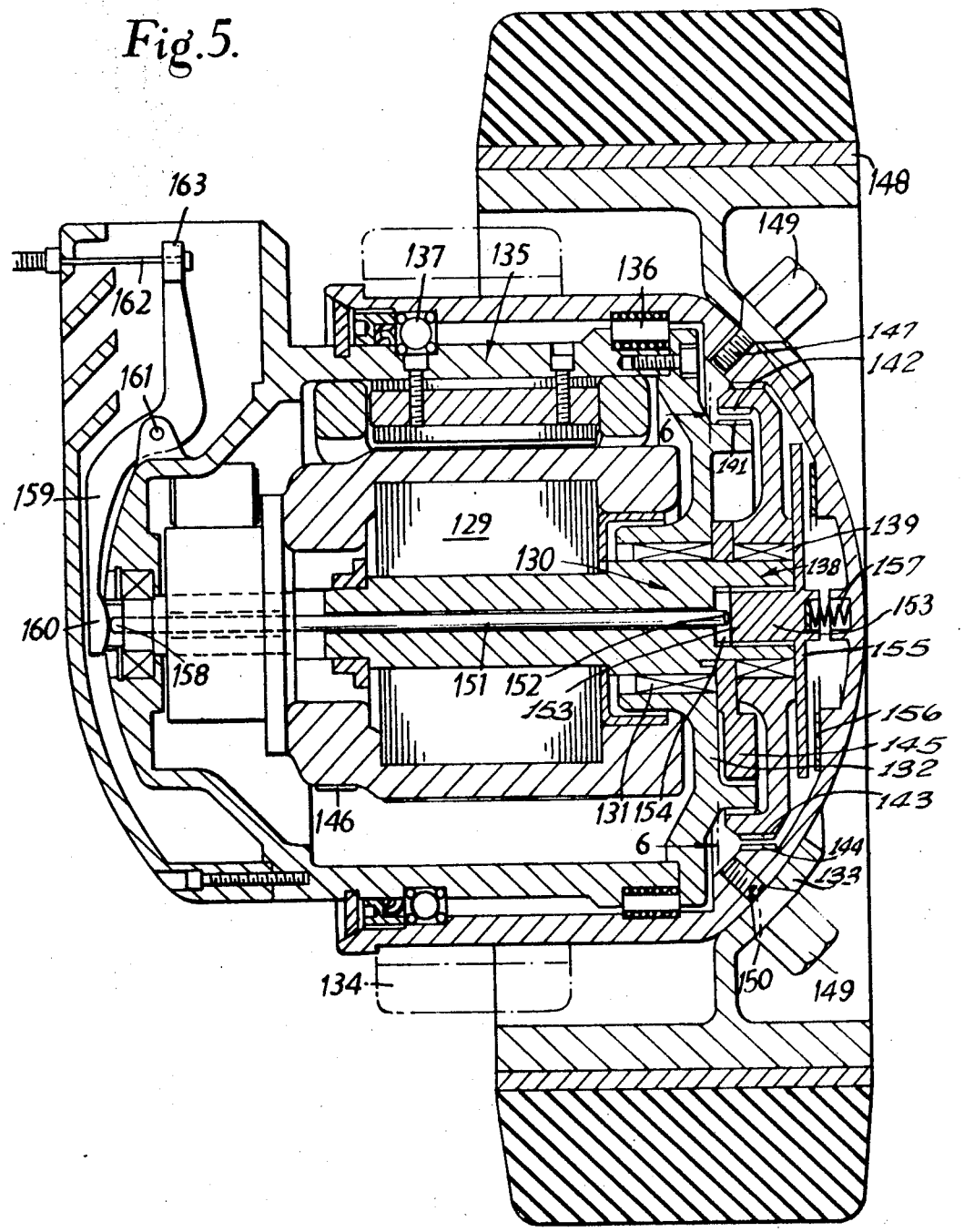
Figure 6:
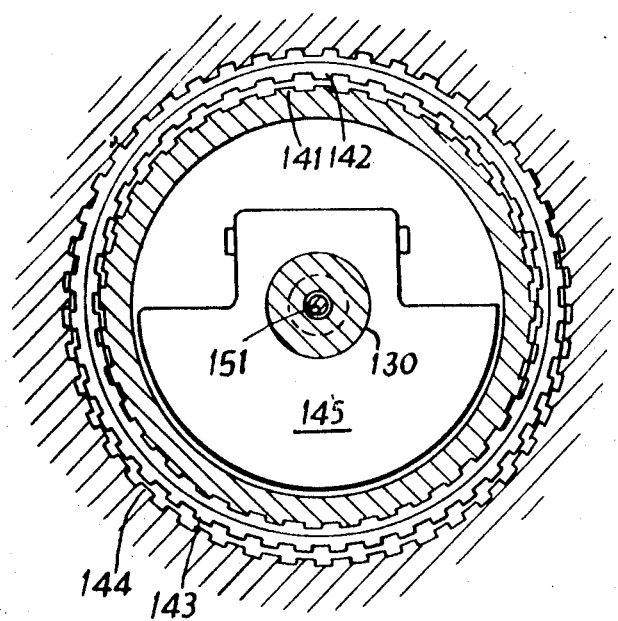

The means whereby the invention is carried into effect will now be described by reference to the embodiments illustrated, by way of example only, in the accompanying drawings, wherein:

FIG. 1 shows a vertical transverse cross section of one embodiment of a motorized wheel according to the invention, and illustrates an electric motor drive, steerable resilient mounting, control connections and transmission brake, FIG. 2 shows an end elevation of the same, one half showing the end cover removed and brake disc partly cut away, FIG. 3 is a plan view of the same, one half showing the periphery of the upper mounting removed to illustrate the suspension spring mounting recesses, FIG. 4 is a front elevation of another embodiment according to the invention, partly in section, showing an hydraulic motor drive, fixed mounting, and offset drive wheel with direct disc brake, FIG. 5 shows a cross section of a further embodiment, and FIG. 6 shows an epicyclic gear of Fig. 5 in end view.

Referring first to Fig. 1, an electric traction motor comprises an armature 1 having a laminated core 2 and windings 3, connected to a commutator 4 around which are mounted brushes 5. Pole-pieces 6 carrying field windings 7 are screwed to the cylindrical yoke 8 which is provided with a mounting flange 9 and an end bracket 10 carrying an armature shaft bearing 11 and a brushgear mounting ring 12 held by clamping screws 13. At the driving end the armature shaft 14 passes through an oil seal 15 and needle roller bearing 16 carried in the motor end frame 17, and terminates in an overhung eccentric 18 which is preferably integral with the shaft 14.

The drive wheel comprises the following assembly: A solid polyurethane tire 19, of a hard grade having high load-carrying capacity and wear resistance, but providing small deflection and therefore low energy loss and rolling resistance, is bonded onto a steel band 20 and is firmly held by an axially corrugated steel tolerance ring 21 on to a cylindrical hub 22 mounted on a bearing 23 carried concentrically with the motor on the end frame 17. A seal to prevent the ingress of dirt and water between the revolving hub 22 and the stationary yoke 8 comprises a disc 24 of rubber or other resilient means supported in a groove 25 in the yoke 8, and having a flexible lip pressed against the inner surface of a conical chamfer 26 in the hub 22, the combination of axial deflection of the sealing lip and radial freedom of the inclined sealing face allowing a greater radial and axial displacement between the relatively rotating members, without loss of sealing contact, than conventional axial or radial surface seals. Moreover the seal is protected from damage in its vulnerable lower section by being recessed within the hub 22 yet does not present any internal surface on which a buildup of abrasive material can occur, while deflections of the hub 22 provide a wiping action to clean the sealing face.

A substantial gearbox end cover 27 is attached to the hub 22 by screws 28, which serve also to clamp the drive wheel assembly to the bearing 23. The end cover 27 is externally contoured to lie on a spherical surface of diameter equal to the overall axial width of the drive unit, so that neither in revolving nor in turning through a steering lock of 360° does it occupy any space which is not swept by a drive wheel of the same diameter when similarly steered; and does not offer any substantial variations of radius which, when driven against a curb or projection, would react against steering rotation of the unit.

Between the motor shaft 14 and drive wheel 19 is provided an epicyclic speed reduction gear of the gyratory planet type, comprising a single wide planet wheel 29 mounted on needle roller bearings 30 on the eccentric 18, and having external gear teeth 31 in mesh with the internal gear teeth 32 of an annulus 33 projecting from the end frame 17. The ratio of the gear reduction is equal to the number of gear teeth on the planet wheel 29 divided by the difference between the number of gear teeth on the annulus and the planet; while the radial eccentricity of the eccentric 18 is equal to half the difference in pitch circle diameter between the annulus gear and the planet gear.

Six equispaced pins 34 of hardened and ground high-tensile steel are shrink fitted into bores in the end frame 27 on a pitch circle diameter concentric with the bearing 23, and carry track rollers 35 engaging in holes 36 equispaced in the planet wheel 29 on the same pitch circle diameter as the pins 34. The holes 36 are diametrically larger than the rollers 35 by twice the radial throw of the eccentric 18.

The track-engaging periphery of the rollers 35 is slightly crowned, so that under conditions of wear in the bearing 23, shock loading on the wheel 19, or heavy torque transmission, any angular displacement of the axis of the pins 34 does not substantially displace the axial position of the line of action of the force between the roller 35 and the interior of the hole 36; thus maintaining substantially centralized loading not only on the needle bearings in the roller 35 itself, but also on the meshing teeth 31 and 32 of the gears and the bearings 30 on the eccentric; and preventing increased bending moment on the cantilevered pins 34 due to outward displacement of the force acting on them.

The sides of the planet wheel 29 are recessed, leaving a web in the center to accommodate rollers 35 of sufficient width to carry the reaction forces to be transmitted. A raised cylindrical ring 37 on the end cover 27 projects into the recess on one side of the planet 29, supporting the pins 34 close to the rollers 35 so that the bending moment on the pins is reduced to a minimum while the length of the bore in which they are held is increased to give maximum support.

A symmetrical recess is provided on the other side of the planet 29 to reduce its weight, and to provide space for a balance weight comprising a semicircular disc 38, pinned to the shaft 14, which rotates to counterpoise the centrifugal force of the eccentric rotation of the planet wheel. For balance, the product of the mass of the balance weight and its distance from the axis of the armature shaft 14 is equal to the product of the masses of the planet wheel 29, bearings 30 and eccentric 18, and the radial eccentricity of the eccentric 18.

Because of the one-sided support of the cantilevered pins 34 and eccentric 18, operating loads cause axial deflection of asymmetric form and hence lateral forces on the rollers 35 and planet wheel 29 which are restrained by roller thrust bearings 39 and 40 respectively.

An oil-filling hole (not shown) sealed with a recessed tapered screwplug is provided in the end cover 27 approximately on the pitch circle of the pins 34. Oil is introduced when the hole is at its lowest position, so that the oil level is limited to a quantity which provides adequate splash lubrication during operation without imposing excessive drag or "pumping" losses. An oil seal 41 retains oil in the gearbox, the space between the seals 41 and 24 being packed with grease to lubricate the bearing 23, and conduct heat from the motor yoke 8 to be dissipated by the hub 22.

At the other end of the motor, the armature shaft is terminated in a splined extension 42 carrying a brake disc 43. A caliper clamping mechanism comprises a bracket 44 mounted on the motor flange 9, in which a transverse shaft 45 carries opposed brake levers 46,47 provided with friction pads 48,49 adapted to grip the brake disc 43. A transverse shaft 50 is carried in slots 51 in the sidewalls of the lever 47, and is centrally flattened at 52 to bear against a tappet head 53 adjustably screwed into the lever 46. A lever arm 54 attached to the shaft 50 projects to the axis of steering rotation of the assembly, for operation by a substantially vertical tension on the ball-ended attachment 55 through mechanical, hydraulic pneumatic or electric brake-actuating means mounted on the vehicle chassis. A tension spring 56 is anchored to the lever 46 by a peg 57, and to the lever 47 by a peg 58; and acts to separate the friction faces 48,49 by a clearance determined by adjustment of the tappet 53 against the cam face 52. An adjustable screw 59 projecting from the lever 46 abuts against the bracket 44, and is adjustable to rotate the caliper assembly about the axis 45 for setting an equal clearance between the braking disc and each friction pad. A spring, not shown, is provided to bias the screw 59 towards the bracket 44, and a further spring, not shown, is provided to bias the lever arm 54 downwards.

In operation of the brake, a substantially vertical pull on the attachment 55 raises the lever 54 and rotates the shaft 50. The cam face 52 bearing against the tappet 53 forces apart the upper end of the levers 46,47 and thereby forces together the brake pads 48,49 against the disc 43. It is appreciated that a certain amount of unbalanced force is applied to the brake disc 43 by the torque reaction of the operating force on the attachment 55 about the lever pivot 45, but this one-sided force is unimportant in relation to the clamping force exerted by the caliper lever system for the same operating force.

A heavy cover 60 is provided for access to the motor brushes and brake gear, and is screwed to the motor frame 10 on a watertight sealing face 61 by screws 62. Ventilating louvers 63 are provided on each side of the upper part of the cover 60 and are divided by a vertical rib 64, so that according to the direction of rotation of the motor, cooling air may be drawn through the louvers on one side, pass over the brake disc, motor commutator, brushgear and end windings, and be ejected through the louvers on the other side. The louvers being positioned substantially above ground level, on a cover maintaining a constant relation to the driving wheel 19 despite steering rotation, the ventilating orifices are protected from splash at all times and thus permit direct ventilation despite exceptionally exposed conditions.

The cover 60 is outwardly contoured below the axis of the drive wheel 19 to lie on a spherical surface, and above said axis to lie on a vertical cylindrical surface, of a diameter equal to the overall axial length of the drive unit for the reasons described above relating to the contour of the gearbox end cover 27.

In order to accommodate a brake disc 43 of maximum working diameter while maintaining maximum motor length within the external configuration of the cover 60, the brake disc 43 is dished to surround the motor end frame without obstructing access to the brushes; and all the braking mechanism is positioned in the upper cylindrical space within the cover 60.

The overall length of the drive unit assembly from the end cover 60 to the gearbox end cover 27 is equal to the diameter of the drive wheel 19, which is positioned midway of this length so that on steering on its own axis through a lock of 360° no space is traversed by any part of the unit which would not normally be left unoccupied in a vehicle for the accommodation of a similarly steerable nonpowered or otherwise driven wheel. Where space is less restricted, the diameter of drive wheel fitted to the unit may be increased, and if desired the motor length may be similarly increased to provide more power.

Horizontally mounted in a circular hole provided in the vehicle chassis 65 is a heavy-duty crossed-roller bearing 66 comprising a divided outer track assembly 67 adjustable to eliminate bearing slack by shims 68, and an inner track on a steering ring 69 comprising a gear-toothed periphery 70 for engagement with a steering control gear mounted on the vehicle and suitable for providing lock-to-lock angles up to 360°. For small steering lock installations a suitable fixed lever arm position may be provided on or attached to the ring 69, while for single-drive wheel, pedestrian-steered installations, bracket means for a steering handle pivot may be provided on or attached to the ring 69.

Attached to the motor flange 9 by substantial bolts 71 is a heavy circular platform 72 comprising a bracket 73 reinforced by webs 74. Recesses 75 in the upper face of the platform 72 support compression springs 76 located in corresponding recesses 77 in the upper steering ring 69, to provide a resilient mounting between the motor unit and the vehicle mounting. Bolts 78 screwed into the steering ring 69 carry spacing collars 79 closely fitting into holes 80 in the bracket 72 to transmit the steering torque, and hold Belleville spring washers 81 to provide rebound control for the suspension. The length of the collars 79 may be chosen to provide a maximum deflection or precompression of the springs 76 on assembly; and the number and characteristics of the suspension springs 76 or rebound springs 81 may be chosen to provide any desired load/deflection rate.

Rubber or other elastic material may be used in shear or compression to provide a resilient suspension between the drive wheel and the vehicle mounting when the quantity production of a specific design warrants the cost of the necessary tooling.

By providing separate resilient suspension for the drive unit which is independent of the tire resilience, it is made possible to use a comparatively thin band of tread material and therefore accommodate a maximum diameter of motor within the wheel; while the choice of tread material is not limited to elastomers and can be chosen primarily for its load-carrying capacity and low rolling resistance. At the same time, by introducing the resilient suspension between the drive unit and the steering mounting instead of resiliently mounting the steering bearing onto the vehicle, it is made possible to provide a steering gear ring or other link or lever attachment which is not displaced by suspension deflections and therefore permits the interconnection of two or more steerable units without special provision to eliminate the effects of suspension movement.

The axis of the steering bearing may be mounted in the vehicle to give a caster or camber effect if required.

Power supply connections to the motor comprise flexible cables 82,83 attached by clips 84 to a fixed cylindrical member 85 attached to the vehicle body, and arranged to roll in a loop 86 between the cylinder 85 and the inner wall of the steering ring 69 during steering rotation. The cables are attached to the inner wall of the ring 69 by clips 87, and pass to the motor terminals through slots 88 in the platform 72, the intermediate length forming a loop arranged to flex freely during suspension deflection.

In order to maintain accurate tracking of the cable loops 86, the pair of cables 83 is spaced to sandwich the pair of cables 82, while a freely rotatable guide tube 89 is supported in and prevents misalignment or entanglement of the rolling cable loops during steering. It will be understood that flexible hollow cables may be substituted for the conveyance of hydraulic or pneumatic power or combustion fuel to an appropriate motor.

Figure 4 shows the use of the same gearbox as described for Fig. 1 applied to a different type of vehicle drive. In this case the drive unit shown represents one of a pair of driving wheels symmetrically mounted on the chassis 100 of a forklift truck in place of a conventional differential drive axle assembly, while the power supply is an engine-driven hydraulic pump mounted in the vehicle chassis.

Hydraulic connections from the vehicle supply a hydraulic motor 102 bolted to a mounting frame 103 attached to the gearbox end frame 17 in place of the electric motor or Fig. 1. The motor 102 is provided with eccentric output shaft means and operates the epicyclic gearbox as previously described to rotate the end cover 27 carried on the main bearing 23.

A solid cushion tire of larger diameter than the tyre 19 and appropriate to the duty of the vehicle is firmly attached to a flanged carrier 105 by a layer of liquid polymer adhesive 106, such as is marketed under the trademark "Loctite" and approved under U.S. Mil. Spec. No. MIL–S–22473 B.

A cylindrical hub 107 replaces the hub 22 of Fig. 1, and provides a mounting for the flanged carrier 105 which positions the tire substantially centrally over the bearing 23, and projects its outer edge beyond the gearbox cover 27 so that the tire track extends to the maximum width of the vehicle.

A flange 108 on the hub 107 provides a braking disc passing between the friction pads 109 of a hydraulically actuated brake caliper assembly 110 mounted on the chassis 100 and controlled through a connection 111.

The mounting frame 103 is bolted directly to the chassis 100 without intermediate suspension as the tire 104 provides conventional resilience.

In order to provide increased braking effort without increasing the depth of flange 108 and thereby reducing ground clearance, a plurality of brake caliper assemblies 110 operated on a narrow flange 108 may be spaced radially around the drive unit mounting and controlled through a common connection 111.

In the embodiments illustrated and described, a standard gear ratio of 19¼ is provided by a planet wheel of 77 teeth and an annulus gear of 81 teeth. Using a 12-inch diameter drive wheel, the motor speed is arranged to give a travel speed of 6 m.p.h. with a 36-volt power supply, suitable for rider-controlled warehouse trucks; a speed of 4 m.p.h. with a 24-volt power supply, suitable for pedestrian-controlled vehicles; and 8 m.p.h. when fitted with a 16-inch diameter drive wheel and a 36-volt power supply, suitable for heavier duty general purpose vehicles.

The hydraulic motor of Fig. 4 is arranged to provide shaft speeds commensurate with the electric motor output, so that a standard drive unit is able to provide every combination of function and performance which a vehicle designer is likely to require.

Intermediate changes of speed may be arranged by variation of input voltage or motor field control in preference to alteration of the motor design, though a standard interchangeable longer motor may be provided for conditions which require greater power and allow greater drive unit length. For torque output requirements in excess of the maximum rating of the gearbox, which will normally be associated with larger vehicles using larger wheels, a further standard drive unit of increased rating may be provided.

A motor end cover with special provision for sealing may be provided to render the unit flameproof.

It will be understood that various changes may be made in the form and construction, assembly and mode of operation of the invention without departing from the concept thereof as defined in the accompanying claims.

In the foregoing I have described my invention in conjunction with a gyratory epicyclic gear system having a single gyratory planet wheel with a counterbalancing weight. The planet wheel is mounted directly upon the motor shaft and the axial compaction of the unit achieved in this way has enabled a substantial increase to be achieved in the horsepower of the unit for a given overall length and diameter.

In order to reduce still further the space required by the gear, I have devised the novel arrangement shown in Figs. 5 and 6.

Referring to Figs. 5 and 6, these show a motorized wheel traction drive unit which apart from the gear system corresponds in its principal features to the unit of Fig. 1. It embodies an electric motor 129 provided with a shaft 130 carried in a needle roller bearing 131 mounted in an end frame 132. A hub 133, to which is attached a wheel 134, is carried on the motor yoke 135 by a wire race roller bearing 136 and a wire race ball bearing 137. Extending from the motor shaft 130 is an eccentric 138 carrying a needle roller bearing 139 on which is mounted a gyratory planet wheel 140. A ring gear 141 attached to the motor end frame 132 meshes with the annular gear 142 of the planet, and a ring gear 143 on the planet meshes with an annular gear 144 attached to the hub 133. A balance weight 145 pinned to the shaft 130 together with a mass 146 on the banding wire of the motor armature provides complete dynamic balance of the rotating parts. A series of boltholes 147 in the hub 133, normally plugged as at 150 to prevent oil leakage, is provided to permit as an alternative to the wheel 134, the attachment of any wheel means such as 148 having a cooperating frustoconical seating which is fixed to the hub by bolts 149.

If the number of teeth on the gear 141 is A
     on the gear 142 is A+D
     on the gear 144 is B
     on the gear 143 is B−D then the ratio R of the input shaft 130 to the output hub 133 is $R=B(A+D)/D(B+A)$.

If $A=36$, $B=45$, and $D=1$, then $R=20.55/1$.

By these means the pins 134 of FIG. 1 are dispensed with and the extremely compact gear construction provides space for a larger drive motor within the same overall axial length of the drive unit.

Alternatively or in addition a modified brake mechanism can be incorporated as shown in FIG. 5.

The motor shaft 30 is bored to accommodate a pushrod 151. At the right-hand end in the drawing the pushrod terminates in a part-spherical end 152 abutting a brake disc carrier 153. The latter is splined to and slidable axially in a counterbore 154 in the end of the motor shaft 130 and carries a brake disc 155 normally spaced from a brake pad 156 on the end of the hub. A helical spring 157 acts between the end of the hub and the member 153 urging the brake disc and pushrod to the left in the drawing.

The left-hand end 158 of the pushrod is also part spherical and an operating lever 159 bears at one end 160 against the end 158 of the pushrod. The lever 159 is pivoted at 161 and an operating cable 162 is coupled to the other end 163 of the lever 159. By pulling on the cable 162 the disc 155 is brought into engagement with the pad 156 to lock the input and output of the gear system to one another. By locking together such rotary parts which normally rotate at different speeds an effective brake can be provided.

What is claimed is:

1. A compact, motorized, ground wheel unit, comprising:
a motor,
a support for said motor,
means mounting said motor as a cantilever upon said support,
a hub,
means mounting said hub for rotation about and substantially coaxial with said motor,
a tire on said hub,
an output shaft in said motor,
a respective earing at each end of said motor to support said shaft
gearing coupling said output shaft to said hub,
said gearing comprising:
an extension of said shaft, said extension projecting from said motor and being supported by said bearing,
a gyratory gearwheel surrounding and eccentrically mounted upon said extension,
a second gearwheel engaging said gyratory gearwheel, and
reaction means coaxial with said motor shaft enabling drive to the hub upon gyration of said gyratory gearwheel, said bearings, said motor shaft, and said extension being of such a size as substantially to carry unbalanced load developed by said gearing during operation, 2. A compact, motorized ground wheel unit, comprising:
a motor,
a support for said motor,
means mounting said motor as a cantilever upon said support,
a hub,
means mounting said hub for rotating about and substantially coaxial with said motor,
a tire on said hub,
an output shaft in said motor,
a respective bearing at each end of said motor to support said shaft,
gearing coupling said output shaft to said hub,
said gearing comprising:
an extension of said shaft, said extension projecting from said motor and being supported by said bearings,
a gyratory gearwheel surrounding an eccentrically mounted upon said extension,
a second gearwheel engaging said gyratory gearwheel, and
reaction means coaxial with said motor shaft enabling drive to the hub upon gyration of said gyratory gearwheel, said bearing, said motor shaft, and said extension being of such a size as substantially to carry unbalanced load developed by said gearing during operation,
wherein a counterbalancing weight is carried on and is secured to the extension of the motor shaft, the teeth of the gyratory gearwheel are on a flange wider than the web of the gyratory gearwheel, and said counterbalancing weight is so disposed as to lie at least partly within the space defined by the flange.

3. A compact, motorized, ground wheel unit comprising, in combination:
a motor, an output shaft in said motor,
a housing for said motor arranged substantially coaxial with said motor,
a hub,
a bearing mounted said hub for rotation substantially coaxially upon said housing with said hub extending around said motor housing,
a ground wheel on said hub,
an epicyclic gear system between said output shaft and said hub,
said gear system comprising:
an eccentric driven by said shaft,
an outwardly toothed gearwheel carried by said eccentric and mounted upon axially directed pins,
an inwardly toothed annulus in mesh with said outwardly toothed gearwheel and carried on one end of said housing in fixed relation thereto and concentric with said motor shaft,
said pins being carried by a part of said hub that extends inwardly around the end of said annulus to be driven around the axis of said motor shaft by said outwardly toothed gearwheel 4. A compact, motorized ground wheel unit comprising:
a hub,
a ground wheel upon said hub,
a tire on said ground wheel,
a motor,
an output shaft in said motor, a support for said motor,
means mounting said motor upon said support,
means mounting said hub for rotation about said motor and substantially coaxial with said shaft,
a gyratory epicyclic gear between one end of said shaft and said hub,
and brake means comprising:
a dished rotary element attached to said shaft, and an actuating mechanism mounted above said shaft and lying substantially within a volume defined by an imaginary cylinder of which the periphery passes through the outermost extremities of said motor and gear 5. A unit according to claim 4, wherein said support is mounted for rotation about an axis for steering the unit and said actuating mechanism comprises control means passing through said support substantially at said axis.

6. A compact, motorized, grounded wheel unit comprising:
a motor,
a support for said motor,
a hub,
means mounting said hub for rotation about said motor,
a tire on said hub, and
gearing coupling said motor to said hub,
in combination with a steerable mounting upon which the unit is mounted, and wherein supply cables are provided for the unit which are flexible and a section of each cable includes a loop constrained to roll between a fixed circular guide and a further circular guide coaxial with the fixed guide and arranged to rotate with the steering movement of the unit,
and a power source, said cables being connected to said power source and to said motor for supplying power from said source to said motor, said motor being movable relative to said power source.

7. A unit according to claim 6, wherein two of the supply cables are so arranged that one of said loops lengthens and the other shortens upon steering of the unit.

8. A unit according to claim 7, wherein means are provided which constrain the loops to roll in predetermined spaced relationship.

9. A unit according to claim 8, wherein the constraining means include a ring around which the two loops pass, to ring being able to move around the space between the two guides.

10. A compact, motorized, ground wheel unit comprising:
a motor,
a support for said motor,
a hub,
means mounting said hub for rotation about said motor,
a tire on said hub,
gearing coupling said motor to said hub,
rotatable mounting means adapted to provide a steering connection for the unit,
and resilient connection means connecting said support to said rotatable mounting means whereby said steering connection is adapted to be isolated from shock-induced movement of said support, wherein the resilient connection means include a plurality of compression springs located close to the periphery of said rotatable mounting means.

11. A unit according to claim 10, wherein the resilient connection means is precompressed.